(12) United States Patent
Meng et al.

(10) Patent No.: US 11,692,236 B2
(45) Date of Patent: Jul. 4, 2023

(54) LASER PROCESSING DEVICE AND METHOD FOR PEENING

(71) Applicant: Jiangsu University, Jiangsu (CN)

(72) Inventors: Xiankai Meng, Jiangsu (CN); Yaomin Zhao, Jiangsu (CN); Jinzhong Lu, Jiangsu (CN); Jianzhong Zhou, Jiangsu (CN); Yanhu Zhang, Jiangsu (CN); Shu Huang, Jiangsu (CN); Jie Cai, Jiangsu (CN); Pengfei Li, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/565,421

(22) Filed: Dec. 29, 2021

(65) Prior Publication Data
US 2022/0243299 A1    Aug. 4, 2022

(30) Foreign Application Priority Data

Feb. 3, 2021    (CN) .......................... 202110150074.3

(51) Int. Cl.
*C21D 10/00*    (2006.01)
*F01D 5/28*    (2006.01)

(52) U.S. Cl.
CPC ........... *C21D 10/005* (2013.01); *F01D 5/286* (2013.01); *G01N 2291/0234* (2013.01)

(58) Field of Classification Search
CPC ........ C21D 10/005; C21D 7/06; B23K 26/00; B23K 26/02; B23K 26/356
USPC .......... 219/624, 128, 121.6, 121.61, 121.63, 219/121.64, 121.78, 121.82, 121.79, 219/121.8, 121.85
See application file for complete search history.

(56) References Cited

U.S. PATENT DOCUMENTS

| | | | | |
|---|---|---|---|---|
| 2014/0263213 | A1* | 9/2014 | Wu ...................... | B23K 26/146 451/36 |
| 2021/0060703 | A1* | 3/2021 | Ma .......................... | C22C 32/00 |

FOREIGN PATENT DOCUMENTS

| | | | | |
|---|---|---|---|---|
| CN | 207900455 U | * | 9/2018 | |
| CN | 110804692 A | * | 2/2020 | ............... B06B 1/06 |
| CN | 112475609 A | * | 3/2021 | ............... B06B 1/06 |

\* cited by examiner

*Primary Examiner* — Tu B Hoang
*Assistant Examiner* — Albat Rosario-Aponte

(57) ABSTRACT

The present invention provides a device for peening by coupling a laser shock wave and an ultrasonic shock wave in real time. The device includes a synchronization device, a laser device, two ultrasonic shock devices, a working platform and a control system. An upper casing is supported above a base through second hydraulic cylinders. Two supporting beams are provided under the upper casing through the second hydraulic cylinders. Limiting slide rails are provided under the upper casing through first hydraulic cylinders. The two ultrasonic shock devices are connected through the synchronization device, which is configured to synchronize movement and rotation of the two ultrasonic shock devices. The laser device is configured to generate a laser beam to pass through the upper casing and irradiate a surface of a workpiece. The control system controls the laser device to lag behind the two ultrasonic shock devices to perform laser shock.

6 Claims, 10 Drawing Sheets

LASER PROCESSING DEVICE AND METHOD FOR PEENING

CROSS-REFERENCE TO RELATED APPLICATION

This application claims the priority benefit of China application serial no. 202110150074.3, filed on Feb. 3, 2021. The entirety of the above-mentioned patent application is hereby incorporated by reference herein and made a part of this specification.

BACKGROUND

Technical Field

The present invention relates to the technical field of laser processing, and in particular to a device and method for peening by coupling a laser shock wave and an ultrasonic shock wave.

Description of Related Art

The laser shock technique aims for the surface peening and forming of a metal material through a shock wave generated by the interaction of a nanosecond pulsed laser beam with the material. However, the shock wave induced by the laser beam alone has low amplitude and short time, resulting in a low residual compressive stress and a low degree of grain refinement on the surface of the part, which leads to a poor peening/forming effect and poor controllability.

A Chinese invention patent proposes a surface peening method for a metal component by means of vibration-assisted laser shock. This method combines laser shock peening (LSP) and vibration aging to refine the surface grains and homogenize the internal residual stress. However, it has the following disadvantages. (1) The vibrator ages the entire sample, but it cannot achieve local peening. (2) The LSP and the vibration aging are performed separately, which cannot overcome the technical defects of low amplitude and short time of the laser shock wave, resulting in low plastic deformation and low residual compressive stress, thereby leading to a poor peening effect.

A Chinese invention patent proposes an ultrasonic vibration device for coaxial ultrasonic assisted laser shot peening. The device realizes the coaxial propagation of a laser shock wave and an ultrasonic shock wave, promotes the dynamic recrystallization behavior of the material, and obtains ultrafine grains on the surface of the material. However, because the propagation velocity of the laser shock wave is much higher than that of the ultrasonic shock wave, the device does not realize the real-time coupling of the laser shock wave and the ultrasonic shock wave. Therefore, it does not solve the technical defects of low amplitude and short time of the laser shock wave, which results in low plastic deformation and low residual compressive stress.

A Chinese invention patent proposes an ultrasonic-assisted laser shot peening method for forming a superfine crystal surface layer. The method uses ultrasound to induce a high-frequency shock wave to form periodic atomic dense areas and sparse areas on the propagation path of the laser shock wave, so as to promote the grain refinement of the material and form a superfine crystal surface layer. However, this method has the following disadvantages. (1) It does not make up for the difference in the propagation velocities of the laser shock wave and the ultrasonic shock wave or realize the real-time coupling of the laser shock wave and the ultrasonic shock wave, resulting in the periodic atomic sparse areas on the path of the laser shock wave. (2) The atomic sparse areas reduce the amplitude of the laser shock wave, and although they promote grain refinement, they reduce plastic deformation and residual compressive stress, thereby weakening the peening effect.

A Chinese invention patent proposes an anti-fatigue device and processing method by means of hollow laser shock and ultrasonic synergistic peening. This patent applies ultrasonic vibration to prevent unevenness in the shock area after laser shot peening, and the ultrasonic vibration interacts with the laser shock wave to form a reasonable residual compressive stress distribution on the surface of the material. However, this patent does not make up for the difference in the propagation velocities of the laser shock wave and the ultrasonic shock wave, and fails to realize the real-time coupling of the laser shock wave and the ultrasonic shock wave. Therefore, it cannot overcome the technical defects of low amplitude and short time of the laser shock wave, which results in low plastic deformation and low residual compressive stress.

SUMMARY

In order to overcome the technical defects of the prior art that cannot make up for the difference in the propagation velocities of a laser shock wave and an ultrasonic shock wave or realize the real-time coupling of the laser shock wave and the ultrasonic shock wave, the present invention provides a device and method for peening by coupling a laser shock wave and an ultrasonic shock wave. The present invention adjusts the initial times, rotation angles and velocities of ultrasonic shock devices to realize the dynamic control of ultrasonic directions and wavefront positions, thereby making up for the difference in the propagation velocities of the laser shock wave and the ultrasonic shock wave. The present invention finally realizes the real-time coupling of the laser shock wave and the ultrasonic shock wave, effectively solves the technical defects of low amplitude and short time of the laser shock wave, and further improves the microstructure/stress peening or forming effect of the metal material.

The above technical objective of the present invention is achieved by the following technical means.

A device for peening by coupling a laser shock wave and an ultrasonic shock wave in real time includes a synchronization device, a laser device, two ultrasonic shock devices, a working platform, and a control system. The working platform includes an upper casing, first hydraulic cylinders, second hydraulic cylinders, limiting slide rails, and a base. A horizontally movable workpiece is clamped above the base; the upper casing is supported above the base through the second hydraulic cylinders; two supporting beams are provided under the upper casing through the second hydraulic cylinders; the two supporting beams are respectively connected to the limiting slide rails through sliding pairs; the limiting slide rails are provided under the upper casing through the first hydraulic cylinders; the two supporting beams are respectively provided with two transmission piles; the two ultrasonic shock devices are provided in the upper casing; the two ultrasonic shock devices are connected through the synchronization device, the synchronization device is configured to synchronize movement and rotation of the two ultrasonic shock devices; the laser device is configured to generate a laser beam to pass through the upper casing and irradiate a surface of the workpiece; and the control system controls the laser device to delay the two ultrasonic shock devices to perform a laser shock, so as to couple the laser shock wave and the ultrasonic shock wave in real time.

Further, the synchronization device includes a driving device, two racks, two first sliding devices, two second sliding devices, two hydraulic oscillating cylinders, and a hydraulic system. The two first sliding devices are arranged in the upper casing; the two first sliding devices are slidably provided with the two hydraulic oscillating cylinders, respectively; output shafts of the two hydraulic oscillating cylinders are directly or indirectly connected to the two ultrasonic shock devices, respectively; the hydraulic system is configured to control the two hydraulic oscillating cylinders to synchronously rotate; the two second sliding devices are arranged in the upper casing; the two second sliding devices are slidably provided thereon with the two racks, respectively; an output end of the driving device is provided with an external gear; the external gear meshes with the two racks; bearings are provided in ends of the two racks, respectively; the output shafts of the two hydraulic oscillating cylinders respectively pass through the bearings, such that the two racks are synchronously moved to allow the two hydraulic oscillating cylinders to be synchronously moved.

Further, the two ultrasonic shock devices each include a shock head, a horn, and a transducer. The transducer is directly or indirectly connected to the output shafts of the two hydraulic oscillating cylinders in a transmission manner; the horn is provided at a bottom of the transducer; a tail end of the horn is provided with the shock head; the shock head and a respective one of the two transmission piles are in contact as a higher pair through the first hydraulic cylinders; and the shock head is rotated around a center of the respective one of the two transmission piles through the synchronization device.

Further, assuming that an initial angle between the shock head and the surface of the workpiece is $\alpha_1$ and an end angle between the shock head and the surface of the workpiece is $\alpha_n$, then the shock head shocks n times between the initial angle and the end angle; and after the two ultrasonic shock devices work for a time $\Delta T$, the control system controls the laser device to perform the laser shock, where the $\Delta T$ is expressed as:

$$\Delta T = \begin{Bmatrix} MAX(T_i) & When\ \alpha_1 < \alpha_n \\ MIN(T_i) & When\ \alpha_1 > \alpha_n \end{Bmatrix},$$

$$\Delta T_i = \frac{S}{2V_{U1}\cos\alpha_i} + \frac{R}{V_{U1}} + \frac{L}{V_{U2}} - \frac{S\tan\alpha_i}{2V_L}$$

Where, S is a center distance of the two transmission piles;

$\alpha_i$ is an angle between the shock head and the surface of the workpiece during an ith shock, $1 < i \leq n$;

R is the two transmission piles;

L is a total length of each of the two ultrasonic shock devices;

$V_L$ is a propagation velocity of the laser shock wave in the workpiece;

$V_{U1}$ is a propagation velocity of the ultrasonic shock wave in the workpiece and each of the two transmission piles; and $V_{U2}$ is a propagation velocity of the ultrasonic shock wave in the horn and the shock head.

Further, a rotational angular velocity $\omega$ of the shock head is expressed as:

$$\omega = \frac{\alpha_{i+1} - \alpha_i}{|\Delta T_{i+1} - \Delta T_i|}$$

Further, the transmission pile is made of a same or similar material as the workpiece to avoid refraction of the ultrasonic shock wave during propagation.

Further, the two racks are respectively provided with electromagnetic devices for locking positions of the two racks on the two second sliding devices.

A peening method using the device for peening by coupling the laser shock wave and the ultrasonic shock wave in real time includes the following steps:

emitting, by the laser device, a laser beam to preheat the workpiece;

controlling, by the control system, the synchronization device to allow the two ultrasonic shock devices to be synchronously rotated until the angle between each of the two ultrasonic shock devices and the surface of the workpiece is $\alpha_1$;

adjusting the center distance of the two transmission piles; adjusting, by the first hydraulic cylinders, heights of the two transmission piles; and controlling, by the synchronization device, the two ultrasonic shock devices to synchronously move toward each other, such that the shock head of each of the two ultrasonic shock devices contacts and compresses the respective one of the two transmission piles;

controlling the second hydraulic cylinders to compress, such that the two transmission piles contact and compress the workpiece;

covering the surface of the workpiece with a confining layer 40;

controlling the two ultrasonic shock devices to release the ultrasonic shock wave; and driving, by the two hydraulic oscillating cylinders, the two ultrasonic shock devices to rotate, such that the two ultrasonic shock devices release the ultrasonic shock wave for n times within a rotation range; and controlling, by the control system, the laser device to perform laser shock, after the two ultrasonic shock devices work for $\Delta T$, so as to couple the laser shock wave and the ultrasonic shock wave in real time for peening.

The present invention has the following beneficial effects.

1. The present invention adjusts the initial times, rotation angles and velocities of the ultrasonic shock devices to realize the dynamic control of the ultrasonic directions and wavefront positions. In this way, the present invention makes up for the difference in the propagation velocities of the laser shock wave and the ultrasonic shock wave, and finally realizes the real-time coupling of the laser shock wave and the ultrasonic shock wave.

2. The present invention forms a continuous atomic dense area on the propagation path of the laser shock wave. This significantly increases the amplitude and time of the shock wave in the material, thereby increasing the plastic deformation and residual compressive stress of the material, and improving the peening or forming effect of the metal material.

3. The present invention expands the control ranges of the amplitudes, space and time distributions of the shock waves in the material through the real-time coupling of the laser and the ultrasonic shock waves, and further expands the control range of the peening or forming effect of the metal material.

DESCRIPTION OF THE EMBODIMENTS

The present invention will be further described in detail below with reference to the drawings and specific embodiments, but the protection scope of the present invention is not limited thereto.

Embodiment 1

Figure 1:
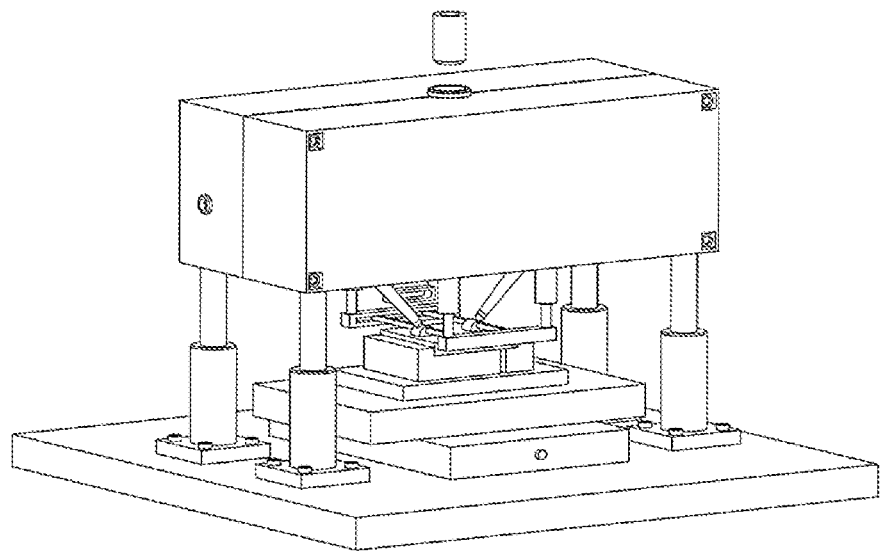
FIG. 1 is a three-dimensional view of a device for peening by coupling a laser shock wave and an ultrasonic shock wave in real time according to the present invention.
Figure 2:
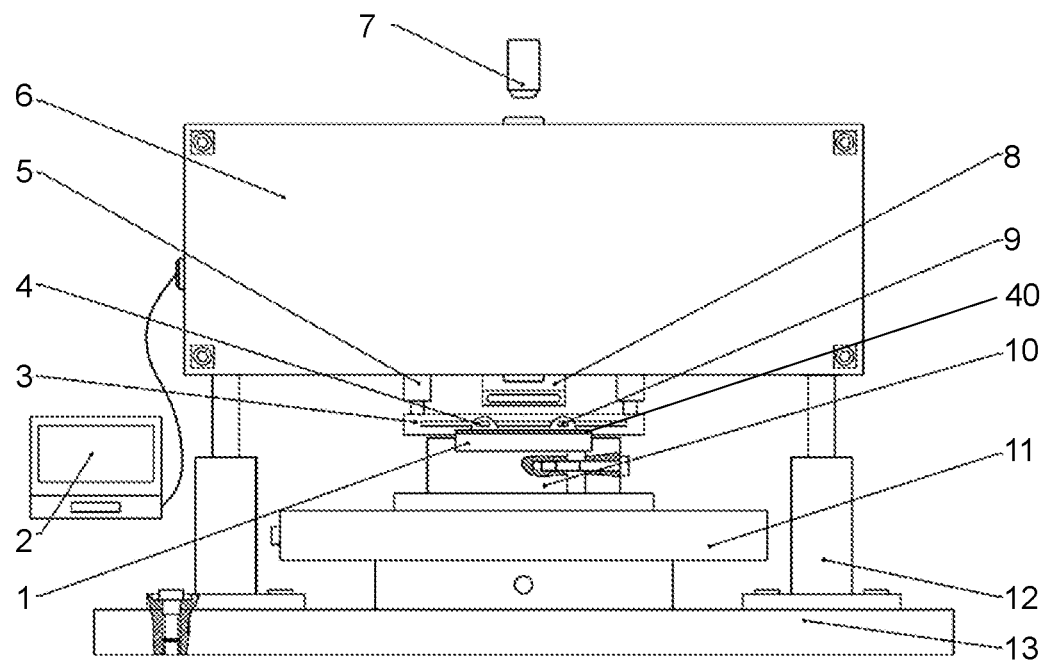
FIG. 2 is a front view of the device for peening by coupling the laser shock wave and the ultrasonic shock wave in real time according to the present invention.
Figure 3:
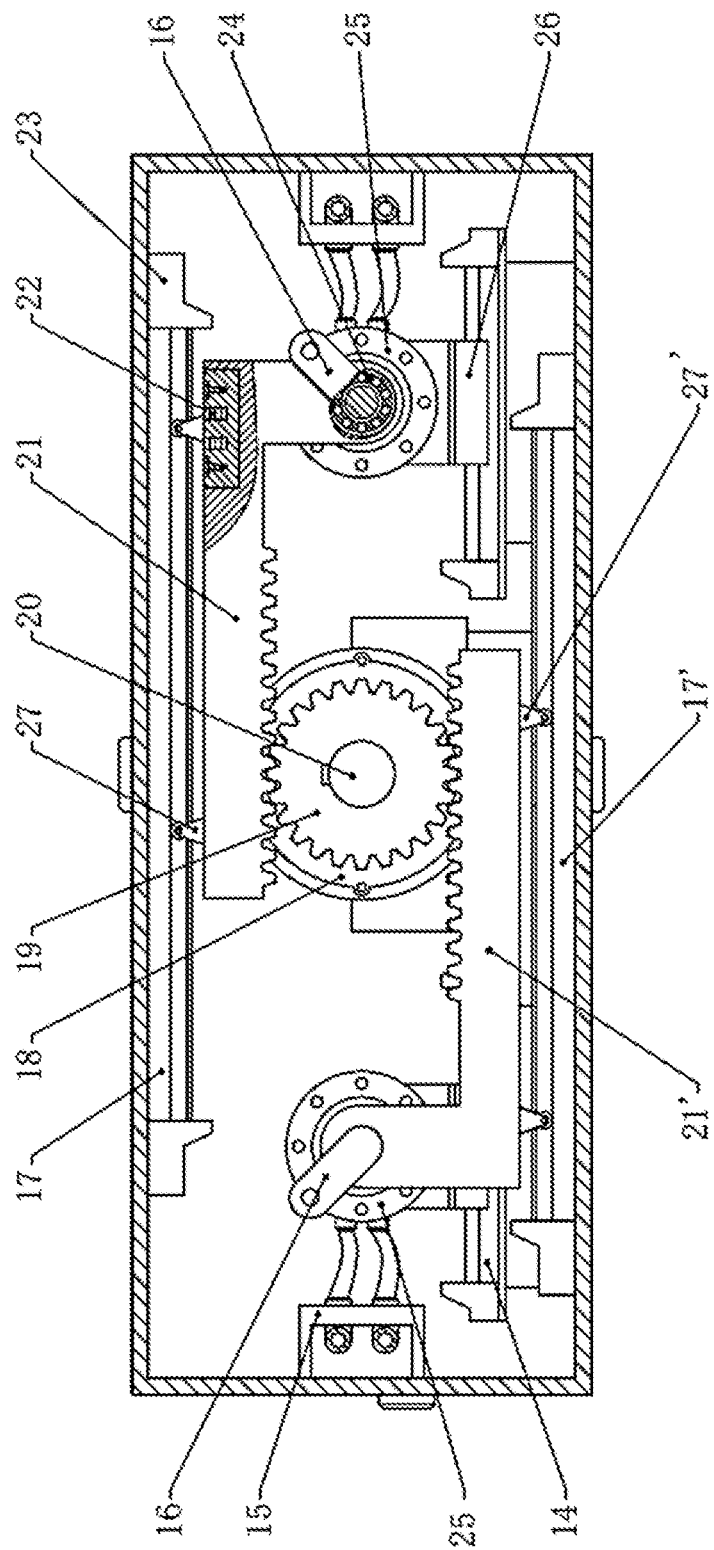
FIG. 3 is a structural view of a synchronization device according to the present invention.

The present invention provides a device for peening by coupling a laser shock wave and an ultrasonic shock wave in real time. As shown in FIG. 1, FIG. 2 and FIG. 3, the device includes a synchronization device, a laser device, two ultrasonic shock devices, a working platform and a control system. The working platform includes an upper casing 6, first hydraulic cylinders 5, second hydraulic cylinders 12, limiting slide rails 3, and a base 13. A workpiece 1 is clamped on a fixture platform 10. A movable platform 11 and the base 13 are sequentially arranged from top to bottom, such that the workpiece 1 moves linearly in X-axis and Y-axis directions.

The upper casing 6 is supported above the base 13 through the second hydraulic cylinders 12. Two supporting beams 9 are provided under the upper casing 6 through the second hydraulic cylinders 12. The two supporting beams 9 are respectively connected to the limiting slide rails 3, and are capable of sliding on the limiting slide rails. The limiting slide rails 3 are provided under the upper casing 6 through the first hydraulic cylinders 5. The two supporting beams 9 are respectively provided with two transmission piles 4. The two supporting beams 9 move in the limiting slide rails 3 through an actuator alone or together. The two transmission piles 4 are respectively in point contact with shock heads 32, and the two transmission piles 4 are made of the same material as the workpiece 1, so as to avoid the refraction of an ultrasonic shock wave during a propagation process to reduce the coupling accuracy.

The two ultrasonic shock devices are provided in the upper casing 6. The two ultrasonic shock devices are connected through the synchronization device, and the synchronization device is configured to synchronize the movement and rotation of the two ultrasonic shock devices. The laser device is configured to generate a laser beam to pass through the upper casing 6 and irradiate a surface of the workpiece 1. The control system controls the laser device to lay behind the two ultrasonic shock devices to perform a laser shock, so as to couple the laser shock wave and the ultrasonic shock wave in real time. In this embodiment, the two ultrasonic shock devices are provided on left and right sides inside the upper casing 6 and are respectively denoted as a left ultrasonic shock device and a right ultrasonic shock device below for description.

As shown in FIG. 3, FIG. 4, FIG. 5 and FIG. 6, the synchronization device includes a driving device, two racks, two first sliding devices, two second sliding devices, two hydraulic oscillating cylinders 25, and a hydraulic system. The two first sliding devices are arranged in the upper casing 6. The two first sliding devices are slidably provided with the two hydraulic oscillating cylinders 25, respectively. Output shafts of the two hydraulic oscillating cylinders 25 are directly or indirectly connected to the two ultrasonic shock devices, respectively. The hydraulic system is configured to control the two hydraulic oscillating cylinders 25 to synchronously rotate. The two second sliding devices are arranged in the upper casing 6. The two second sliding devices are slidably provided thereon with the two racks, respectively. An output end of the driving device is provided with an external gear 19. The external gear 19 meshes with the two racks. Bearings 24 are provided in ends of the two racks, respectively. The output shafts of the two hydraulic oscillating cylinders 25 respectively pass through the bearings 24, such that the two racks are synchronously moved to allow the two hydraulic oscillating cylinders 25 to be synchronously moved. The hydraulic system includes an oil tank and hydraulic pumps 38 for providing hydraulic energy.

The specific structure of the embodiment is as follows. In this embodiment, the driving device includes a motor 18, an external gear 19 and and a motor shaft 20, each of the two first sliding devices includes a first guide rail 14 and a ball slider 26, one of the two second sliding devices includes an upper second slide rail 17 and upper pulleys 27, and the other one of the two second sliding devices includes a lower second slide rail 17' and lower pulleys 27. The motor 18 is provided inside the bottom of the casing 6 and the external gear 19 is provided on the motor shaft 20 of the motor 18. The external gear 19 is provided with an upper rack 21 and a lower rack 21' symmetrically up and down. The upper rack 21 is connected and fixed to the upper pulleys 27. The upper pulleys 27 are provided on the upper second slide rail 17. The upper second slide rail 17 is connected and fixed to an inner top of the casing 6, and the upper second slide rail 17 is provided with stoppers 23 on both sides. The lower rack 21' is connected and fixed to the lower pulleys 27'. The lower pulleys 27' are provided on the lower second slide rail 17'. The second slide rail 17' is connected and fixed to an inner bottom of the casing 6, and the second slide rail 17' is provided with stoppers 23 on both sides. The external gear 19 synchronously drives the upper rack 21 and the lower rack 21' to move linearly. Tail ends of the upper rack 21 and the lower rack 21' are respectively provided with mounting holes for the bearings 24. A second connecting shaft 39 is provided in an inner ring of each of the bearings 24. Electromagnetic devices 22 are respectively provided at a joint of the upper rack 21 and the upper pulleys 27 and a joint of the lower rack 21' and the lower pulleys 27'. After the positions of the upper rack 21 and the lower rack 21' are adjusted the electromagnetic devices 22 are activated to fix the upper rack 21 and the lower rack 21' to prevent the two racks from moving due to vibration or misoperation. The two hydraulic oscillating cylinders 25 are located on the left and right sides in the upper casing 6. Bottoms of the two hydraulic oscillating cylinders 25 are respectively threaded with ball sliders 26. The ball sliders 26 are respectively provided on the first guide rails 14. Second connecting shafts 39 are respectively provided at output ends of the two hydraulic oscillating cylinders 25. The second connecting shafts 39 respectively pass through inner rings of the bearings 24 to be connected to some ends of connecting rods 16, and other ends of the connecting rods 16 are respectively connected to the two ultrasonic shock devices through first connecting shafts 29.

The left ultrasonic shock device and the right ultrasonic shock device have the same structure, and only differ in positions. The following description takes the left ultrasonic shock device as an example. The left ultrasonic shock device includes a shock head 32, a horn 33, and a transducer. A top of the transducer 28 is connected to a respective one of the connecting rods 16 through a respective one of the first connecting shafts 29. The horn 33 is provided at a bottom of the transducer 28, and a tail end of the horn 33 is provided with the shock head 32.

Figure 4:
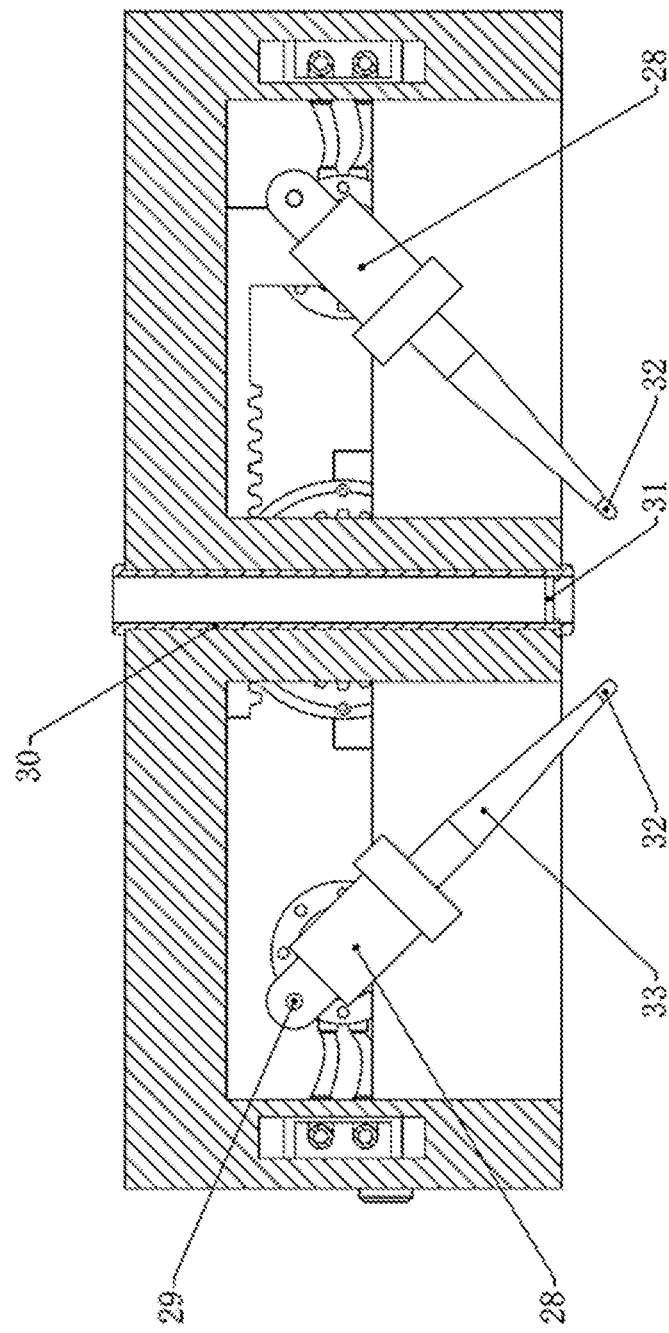
FIG. 4 is a structural view of ultrasonic shock devices according to the present invention.

FIG. 4 shows a laser and an optical system. A light path tube 30 is provided in the casing 6. A bottom of the light path tube 30 is provided with an optical lens 31 for waterproofing, and the light path tube 30 is coaxial with the laser 7.

Assuming that an initial angle between the shock head 32 and a surface of the workpiece 1 is $\alpha_1$ and an end angle between the shock head 32 and the surface of the workpiece 1 is $\alpha_n$, then the shock head 32 shocks n times between the initial angle and the end angle. After the two ultrasonic shock devices work for $\Delta T$, the control system controls the laser device to perform laser shock, where $\Delta T$ is expressed as:

$$\Delta T = \begin{Bmatrix} MAX(T_i) & \text{When } \alpha_1 < \alpha_n \\ MIN(T_i) & \text{When } \alpha_1 > \alpha_n \end{Bmatrix},$$

$$\Delta T_i = \frac{S}{2V_{U1}\cos\alpha_i} + \frac{R}{V_{U1}} + \frac{L}{V_{U2}} - \frac{S\tan\alpha_i}{2V_L}$$

A rotational angular velocity $\omega$ of the shock head is expressed as:

$$\omega = \frac{\alpha_{i+1} - \alpha_i}{|\Delta T_{i+1} - \Delta T_i|}$$

Where, S is a center distance of the two transmission piles 4;

$\alpha_i$ is an angle between the shock head 32 and the surface of the workpiece 1 during an $i^{th}$ shock, $1 < i \leq n$;

$\alpha_{i+1}$ is an angle between the shock head 32 and the surface of the workpiece 1 during an $(i+1)^{th}$ shock, where $1 < i \leq n$;

R is the two transmission piles 4;

L is a total length of each of the two ultrasonic shock devices;

$\Delta T_i$ is a working time of the two ultrasonic shock devices during the $i^{th}$ shock;

$\Delta T_{i+1}$ is a working time of the two ultrasonic shock devices during the $(i+1)^{th}$ shock;

$V_L$ is a propagation velocity of the laser shock wave in the workpiece 1;

$V_{U1}$ is a propagation velocity of the ultrasonic shock wave in the workpiece and each of the two transmission piles; and $V_{U2}$ is a propagation velocity of the ultrasonic shock wave in the horn and the shock head.

Figure 7:
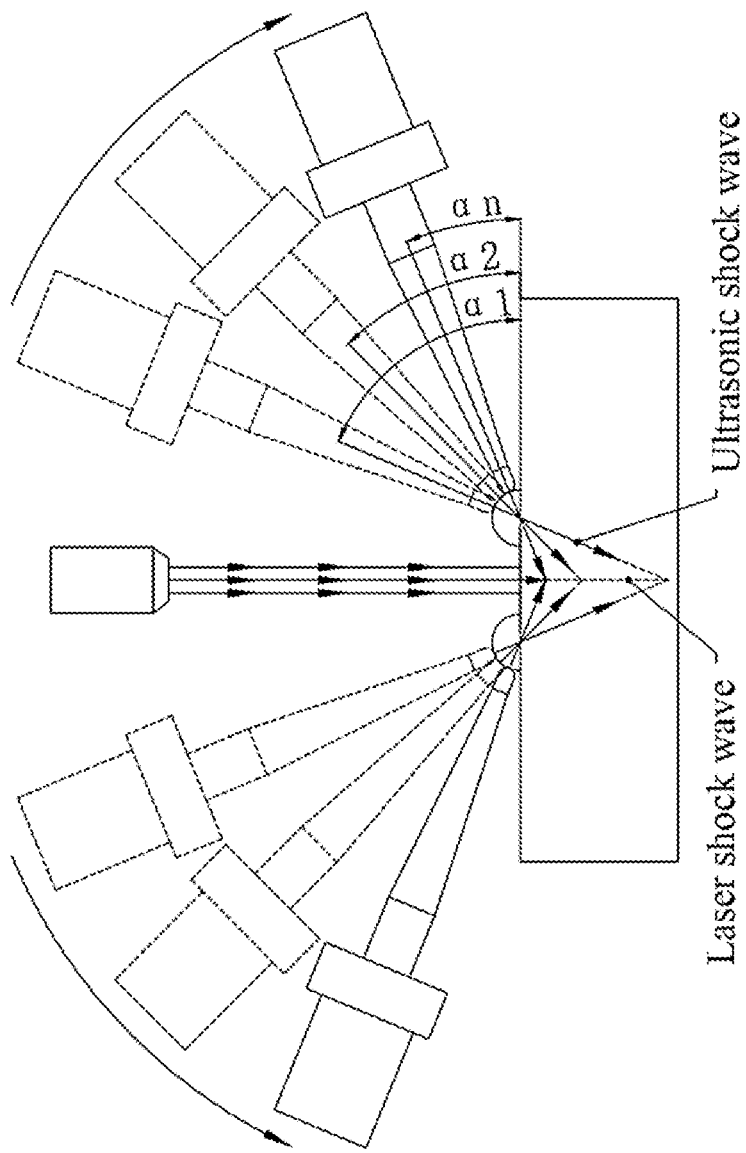
FIG. 7 shows a process of peening by a laser shock wave and an ultrasonic shock wave coupled in real time according to the present invention.
Figure 8:
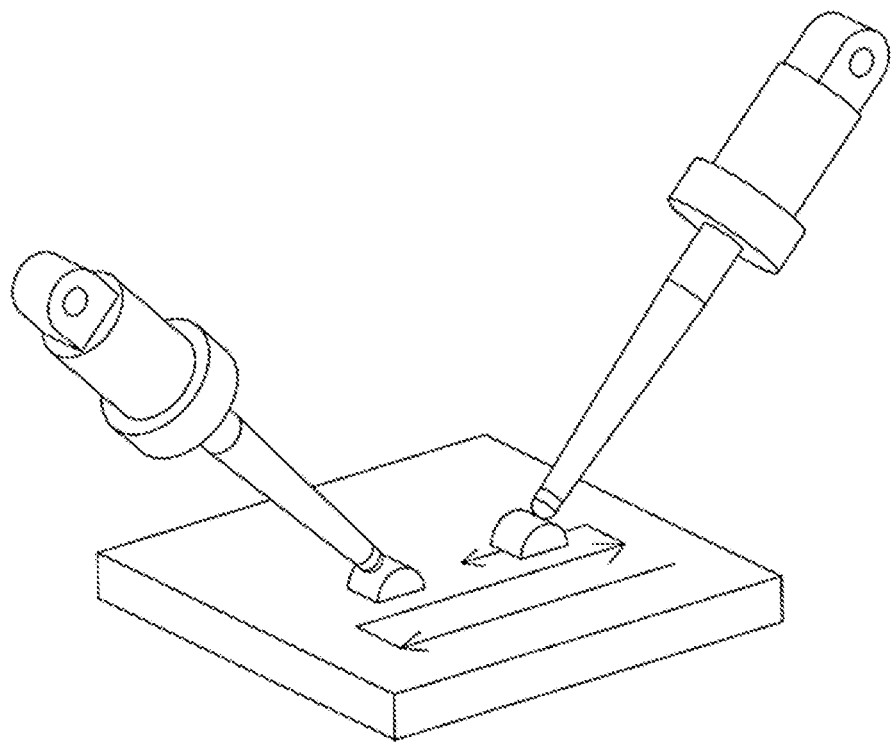
FIG. 8 shows a path for peening by a laser shock wave and an ultrasonic shock wave coupled in real time according to the present invention.

As shown in FIG. 7 and FIG. 8, a peening method using the device for peening by coupling the laser shock wave and the ultrasonic shock wave in real time includes the following steps.

S01: A workpiece 1 is preprocessed.

S02: A computer 2 is turned on, and the laser 7 is also turned on for preheating. The workpiece 1 is clamped on the fixture platform 10. The movable platform 11 is adjusted in the X direction and the Y direction, such that the workpiece 1 is at a starting position of processing.

S03: The computer 2 controls the two hydraulic oscillating cylinders 25 to drive the connecting rods 16 to rotate until an angle between each of the shock heads 32 on the left and right sides and a horizontal plane is $\alpha_1$.

S04: The computer 2 controls the supporting beams 9 to translate, such that the two transmission piles 4 on the left and right sides are moved to a suitable position. The first hydraulic cylinders 5 compress and drive the two transmission piles 4 to move upward for a certain distance. The motor 18 is controlled such that the motor shaft 20 drives the gear 19 to rotate counterclockwise. The two straight racks move towards each other until the shock heads 32 contact and compress the transmission piles 4 with a suitable pressure, respectively.

S05: The computer controls the second hydraulic cylinders 12 to compress, such that each of the shock heads 32 and a respective one of the transmission piles 4 are lowered as a whole until the transmission piles 4 contact and compress the workpiece 1 with a suitable pressure.

S06: A water spray of a water gun 8 covers the surface of the workpiece. The transducer 28 is initiated to release the ultrasonic shock wave. The two hydraulic oscillating cylinders 25 drive the connecting rods 16 to rotate and drive the shock heads 32 to move from the initial angle $\alpha_1$ to an end angle $\alpha_n$ within a set time $\Delta t$. After the ultrasonic shock waves are loaded for $\Delta T$ (µs), the laser 7 releases a laser beam. After the operation, the shock heads 32 return to an original angle to complete the single-point peening.

S07: The movable platform 11 moves at a constant velocity along the positive X-axis direction to complete a single linear processing path. It then moves to the Y-axis direction at a constant velocity and translates to a next processing path until the peening of a preset area by the laser shock wave and the ultrasonic shock wave coupled in real time is completed.

S08: The laser 7 is turned off. The shock heads 32 and the transmission piles 4 are raised to an initial position. The workpiece 1 is taken out, and the peening is completed.

Figure 11:
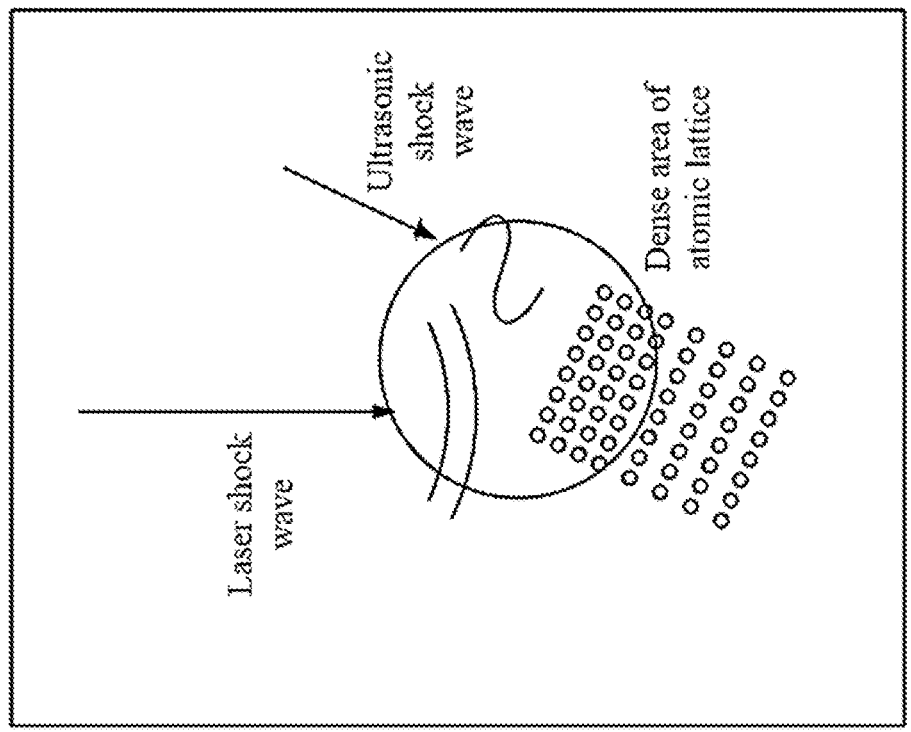
FIG. 11 shows periodic changes of atoms inside a material.
Figure 11:
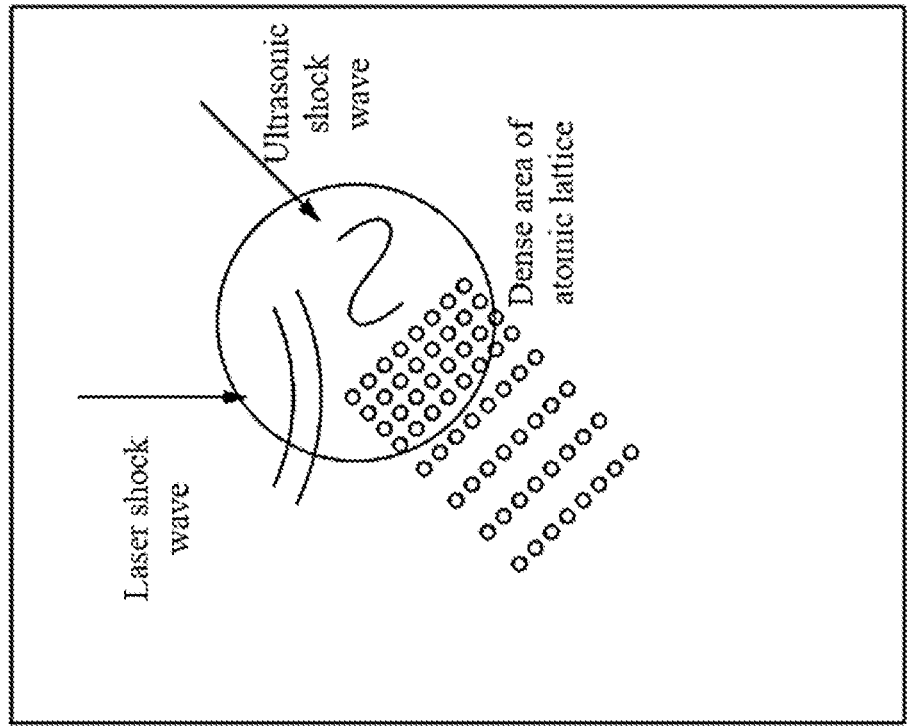

As shown in FIG. 11, the present invention realizes the real-time coupling of the laser shock wave and the ultrasonic shock wave, and forms a continuous atomic dense area on a propagation path of the laser shock waves. This significantly increases the amplitude and time of the shock wave in the material, thereby increasing the plastic deformation and residual compressive stress on the material surface.

Embodiment 2

The device for peening by coupling the laser shock wave and the ultrasonic shock wave in real time is used to peen a 2024-T351 aluminum alloy sheet with a thickness of 2 mm. The specific process is as follows.

ΔT is calculated as follows.

The initial angle between the shock head 32 and the surface of the workpiece 1 is $\alpha_1=30°$, and the end angle between the shock head 32 and the surface of the workpiece 1 is $\alpha_3=22°$. n=3, that is, the shock head 32 shocks for 3 times between the initial angle and the end angle. An intermediate value is taken, that is, $\alpha_2=26°$. ΔT, is calculated as follows.

The propagation velocity $V_{U1}$ of the ultrasonic shock wave in the aluminum alloy workpiece and the transmission piles is approximately 6,320 m/s.

The propagation velocity $V_{U2}$ of the ultrasonic shock wave in the stainless steel horn and the shock head is approximately 5,900 m/s.

The propagation velocity $V_L$ of the laser shock wave in the aluminum alloy workpiece is approximately 6,380 m/s.

The size of the workpiece is 20 mm×20 mm×2 mm, S=12 mm.

When $\alpha_1=30°$, $\Delta T_1$ 18.135 μs.
When $\alpha_2=26°$, $\Delta T_2$ 18.180 μs.
When $\alpha_3=22°$, $\Delta T_3$ 18.226 μs.
Because $\alpha_1>\alpha_3$, $\Delta T=\text{MIN}(\Delta T_1, \Delta T_1, \Delta T_1)=\Delta T_1$.
$\omega_1=0.247$ rad/s
$\omega_2=0.242$ rad/s The laser shock wave and the ultrasonic shock wave are emitted as follows.

A first ultrasonic shock wave is emitted at $\alpha_1$. During a period of $\Delta T_1$ $\Delta T_2-\Delta T_1$, each of the shock heads rotates to $\alpha_2$ at $\omega_1$ to emit a second ultrasonic shock wave. During a period of $\Delta T_2=\Delta T_3-\Delta T_2$, each of the shock heads rotates to $\alpha_3$ at $\omega_1$ to emit a third ultrasonic shock wave. A laser beam is emitted after $\Delta T_1$.

The whole process is as follows.

Figure 5:
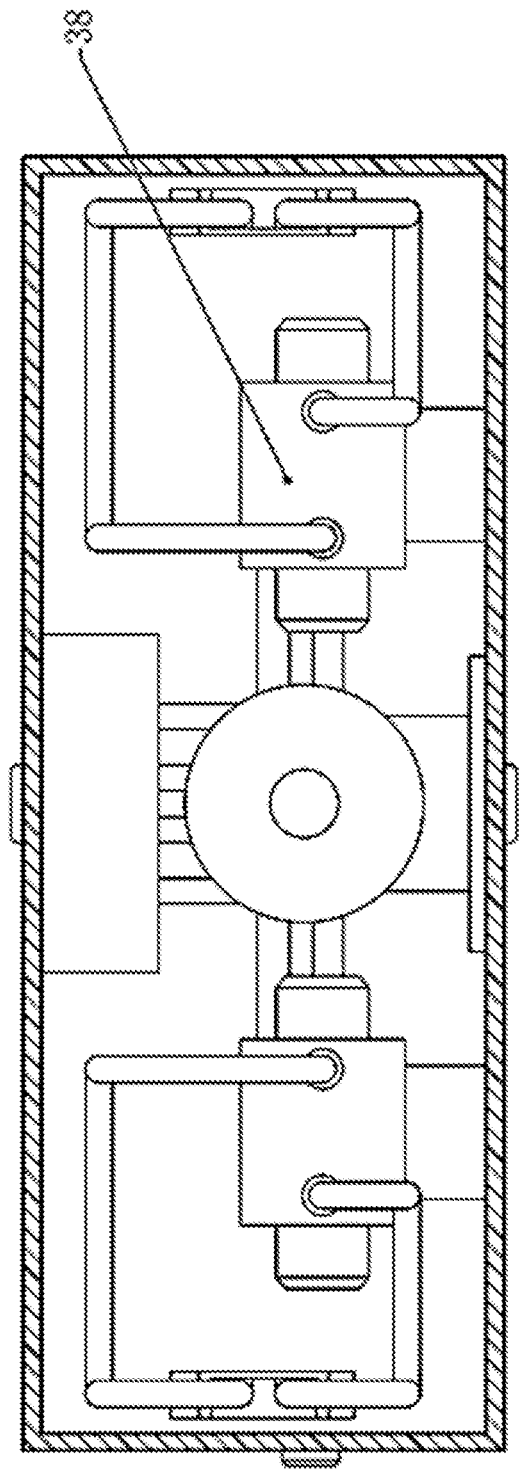
FIG. 5 is a top view of the structure shown in FIG. 3.
Figure 6:
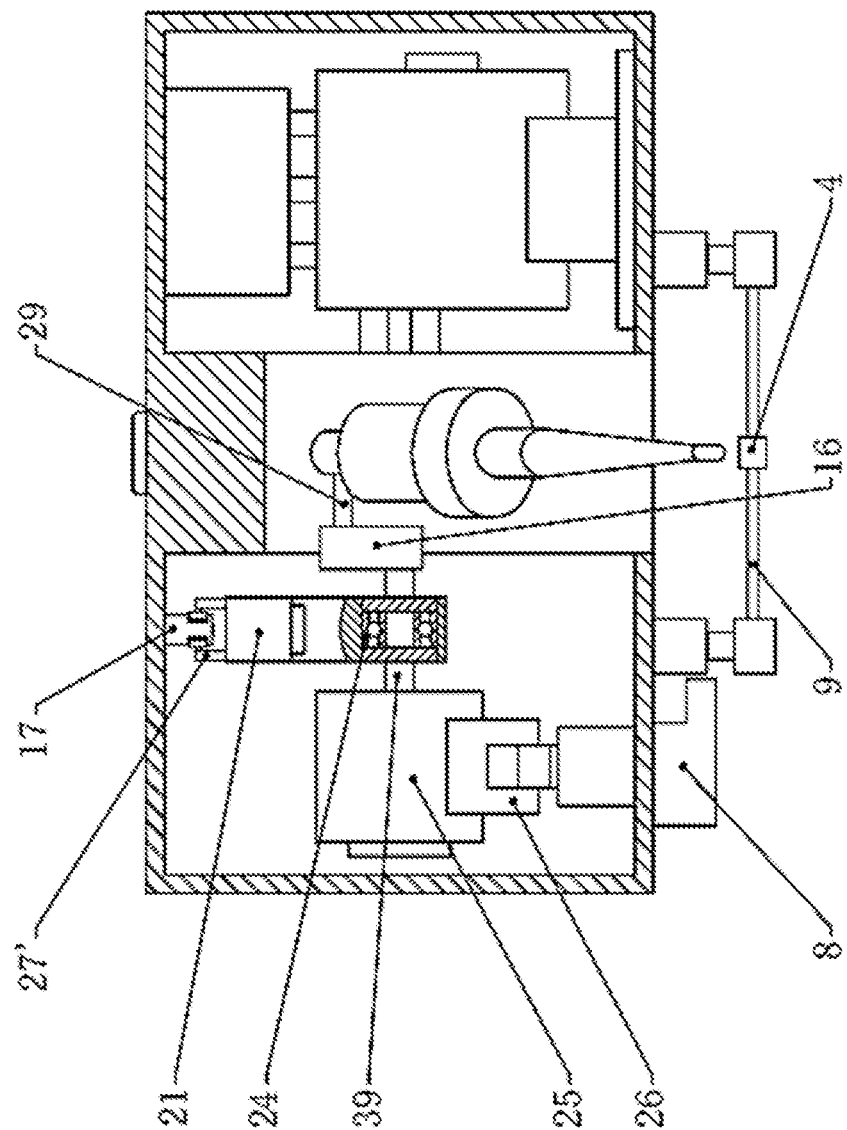
FIG. 6 is a left view of the structure shown in FIG. 3.

The 2024-T351 aluminum alloy sheet is wire-cut into a block workpiece with a size of 20 mm×20 mm×2 mm. After cutting, the workpiece 1 is cleaned with alcohol, and the surface to be processed is sequentially ground, polished, and attached with a black tape. The laser 7 is turned on for preheating. The workpiece 1 is firmly clamped on the fixture platform 10. The movable platform 11 is adjusted such that a starting point of a 12 mm*12 mm area of the workpiece 1 to be processed is directly below a center of the laser 7. The computer 2 controls the rotation angles of the two shock heads 32 to reach the initial angle. The supporting beams 9 are controlled to move, such that the two transmission piles 4 on the left and right sides are horizontally moved to a suitable position. The first hydraulic cylinders 5 compress, such that the transmission piles 4 are raised for a certain distance. The computer 2 controls the motor 18, such that the two shock heads 32 horizontally move toward each other to contact and compress the transmission piles 4, respectively. The second hydraulic cylinders 12 are controlled to compress, such that each of the shock heads 32 and the respective one of the transmission piles 4 are lowered as a whole to contact and compress the workpiece 1. The water gun 8 sprays water to process as designed. After the operation is finished, the shock heads 32 return to the initial angle. The movable platform 11 moves linearly at a constant velocity in the positive X-axis direction at 1.5 mm/s. When a single path ends, the movable platform moves for 1.5 mm to the Y-axis direction at a constant velocity to start the next path processing. The processing path is shown in FIG. 5. The operation is repeated in this way until a preset path is completed. The laser is turned off. The shock heads 32 and the transmission piles 4 are raised to an initial position. The workpiece 1 is taken out, and the peening is completed.

Figure 9:
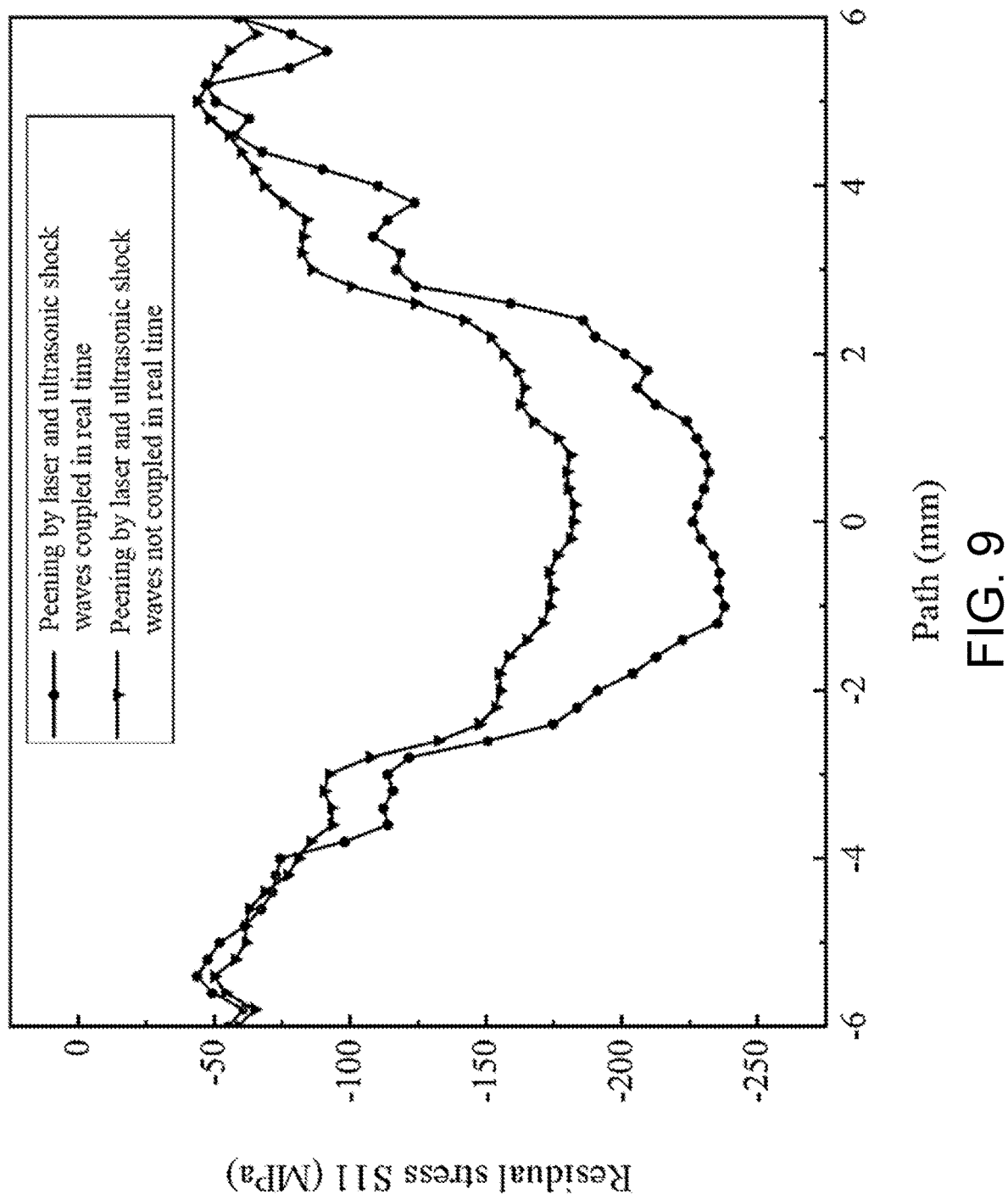
FIG. 9 shows residual stress results in a surface direction of a 2024-T351 aluminum alloy workpiece after peening in different ways.
Figure 10:
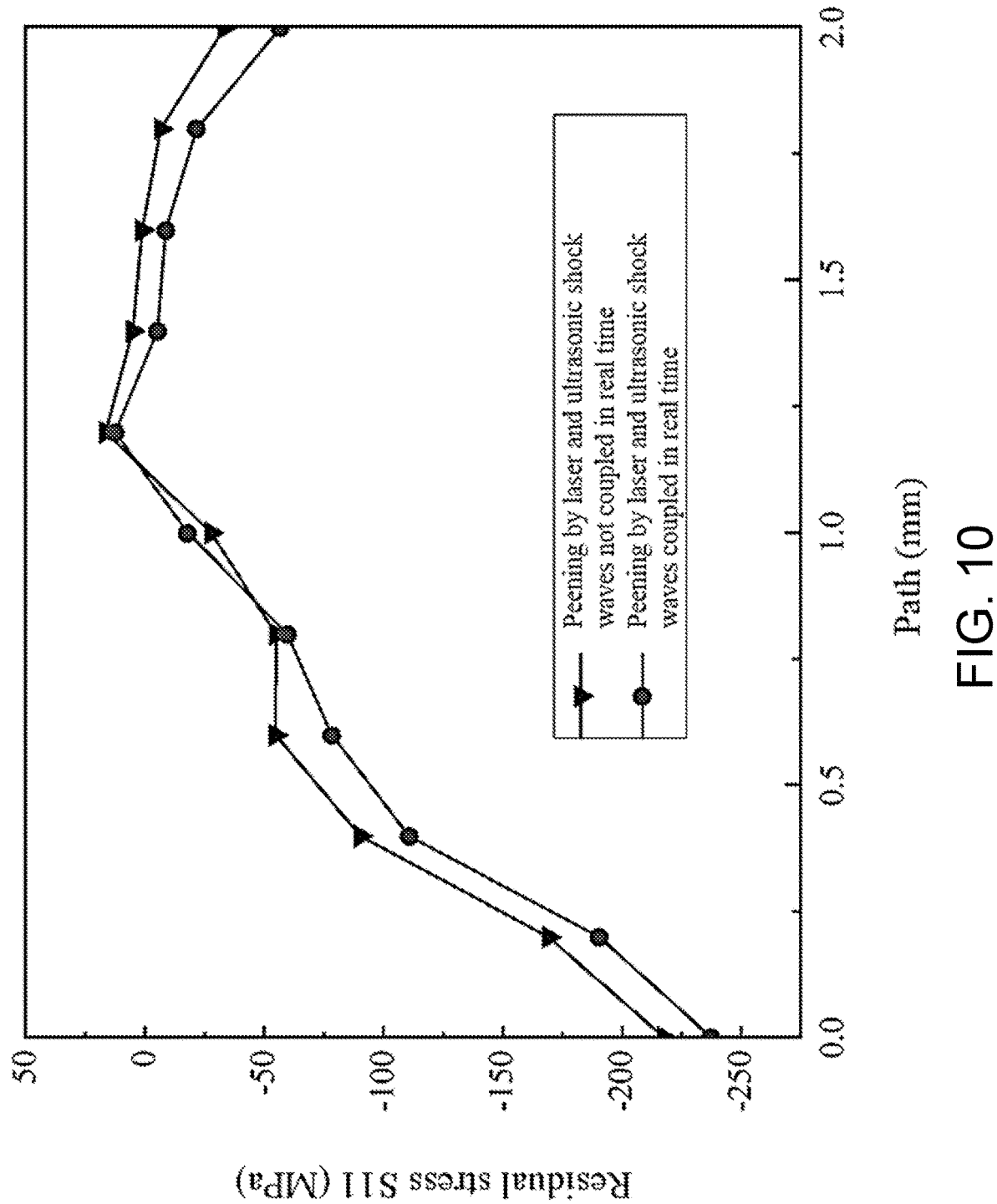
FIG. 10 shows residual stress results in a depth direction of the 2024-T351 aluminum alloy workpiece after peening in different ways.

After synergistic peening by laser shock wave and ultrasonic shock wave not coupled in real time, the average residual compressive stress in the main peened area of the sample surface is about 200 MPa, as shown in FIG. 9. After peening by laser shock wave and ultrasonic shock wave coupled in real time, the average residual compressive stress in the main peened area of the sample surface is about 140 MPa, as shown in FIG. 10. Compared with the non-real-time-coupled peening, the residual compressive stress in the real-time-coupled peening is greatly improved, and a larger residual compressive stress is obtained in the surface direction.

FIG. 10 shows the residual stress in the depth direction of the 2024-T351 aluminum alloy workpiece after peening in different ways. After the non-real-time-coupled synergistic peening, the maximum residual compressive stress on the sample surface is about 220 MPa, and there is a small amount of residual tensile stress in the material at a depth of 0.75-1.5 mm. After the real-time-coupled peening, the maximum residual compressive stress on the surface of the sample is about 235 MPa, which is greatly improved, and the change of the residual stress in the depth direction is relatively stable. Compared with the non-real-time-coupled peening, in the real-time-coupled peening, the sample obtains larger residual compressive stresses at various depths, and effectively release the residual tensile stresses generated by the single laser shot peening in the sample, which significantly extends the fatigue life of the workpiece.

The above embodiments are preferred implementations of the present invention, but the present invention is not limited to the above implementations. Any obvious improvement, substitution or modification made by those skilled in the art without departing from the essence of the present invention should fall within the protection scope of the present invention.

What is claimed is:

1. A device for peening by coupling a laser shock wave and an ultrasonic shock wave in real time, the device comprising a synchronization device, a laser device, two ultrasonic shock devices, a working platform and a control system, wherein
the working platform comprises an upper casing, first hydraulic cylinders, second hydraulic cylinders, limiting slide rails, and a base, wherein a horizontally movable workpiece is clamped above the base, the upper casing is supported above the base through the second hydraulic cylinders; the two supporting beams are respectively connected to the limiting slide rails, and are capable of sliding on the limiting slide rails; the limiting slide rails are provided under the upper casing, the first hydraulic cylinders are provided between the limiting slide rails and the upper casing; the two supporting beams are respectively provided with two transmission piles; the two ultrasonic shock devices are provided in the upper casing; the two ultrasonic shock devices are connected through the synchronization device, the synchronization device is configured to synchronize movement and rotation of the two ultrasonic shock devices; the laser device is configured to generate a laser beam to pass through the upper casing and irradiate a surface of the workpiece; and the control system controls the laser device to lag behind the two ultrasonic shock devices to perform a laser shock, so as to couple the laser shock wave and the ultrasonic shock wave in real time;

the synchronization device comprises a driving device, two racks, two first sliding devices, two second sliding devices, two hydraulic oscillating cylinders, and a hydraulic system, wherein the two first sliding devices are arranged in the upper casing; the two first sliding devices are slidably provided with the two hydraulic oscillating cylinders, respectively; output shafts of the two hydraulic oscillating cylinders are connected to the two ultrasonic shock devices, respectively; the hydraulic system is configured to control the two hydraulic oscillating cylinders to synchronously rotate; the two second sliding devices are arranged in the upper casing; the two second sliding devices are slidably provided thereon with the two racks, respectively; wherein each of the two first sliding devices comprises a first guide rail and a ball slider, and the ball slider is provided on the first guide rail; one of the two second sliding devices comprises an upper second slide rail and upper pulleys, and the other one of the two second sliding devices comprises a lower second slide rail and lower pulleys, the upper pulleys are provided on the upper second slide rail, and the lower pulleys are provided on the lower second slide rail;

the driving device comprises a motor and a motor shaft, and an external gear, and the external gear is provided on the motor shaft; the external gear meshes with the two racks; bearings are provided in ends of the two racks, respectively; the output shafts of the two hydraulic oscillating cylinders respectively pass through the bearings, such that the two racks are synchronously moved to allow the two hydraulic oscillating cylinders to be synchronously moved; and the two ultrasonic shock devices each comprises a shock head, a horn, and a transducer, wherein the transducer is connected to the output shafts of the two hydraulic oscillating cylinders; the horn is provided at a bottom of the transducer; a tail end of the horn is provided with the shock head; the shock head and a respective one of the two transmission piles are in contact through the first hydraulic cylinders; and the shock head is rotated around a center of the respective one of the two transmission piles through the synchronization device.

2. The device for peening by coupling the laser shock wave and the ultrasonic shock wave in real time according to claim 1, wherein assuming that an initial angle between the shock head and the surface of the workpiece is $\alpha_1$, and an end angle between the shock head and the surface of the workpiece is $\alpha_n$, then the shock head shocks n times between the initial angle and the end angle; and after the two ultrasonic shock devices work for a time $\Delta T$, the control system controls the laser device to perform the laser shock, wherein the $\Delta T$ is expressed as:

$$\Delta T = \begin{Bmatrix} \text{MAX}(T_i) & \text{When } \alpha_1 < \alpha_n \\ \text{MIN}(T_i) & \text{When } \alpha_1 > \alpha_n \end{Bmatrix},$$

$$\Delta T_i = \frac{S}{2V_{U1}\cos\alpha_i} + \frac{R}{V_{U1}} + \frac{L}{V_{U2}} - \frac{S\tan\alpha_i}{2V_L}$$

wherein, S is a center distance of the two transmission piles;
$\alpha_i$ is an angle between the shock head and the surface of the workpiece during an $i^{th}$ shock, wherein $1 < i \leq n$;
R is the two transmission piles;

L is a total length of each of the two ultrasonic shock devices;
$V_L$ is a propagation velocity of the laser shock wave in the workpiece;
$V_{U1}$ is a propagation velocity of the ultrasonic shock wave in the workpiece and each of the two transmission piles; and
$V_{U2}$ is a propagation velocity of the ultrasonic shock wave in the horn and the shock head.

3. The device for peening by coupling the laser shock wave and the ultrasonic shock wave in real time according to claim 2, wherein a rotational angular velocity ω of the shock head is expressed as:

$$\omega = \frac{\alpha_{i+1} - \alpha_i}{|\Delta T_{i+1} - \Delta T_i|}.$$

4. The device for peening by coupling the laser shock wave and the ultrasonic shock wave in real time according to claim 1, wherein the two transmission piles are made of a same or similar material as the workpiece to avoid refraction of the ultrasonic shock wave during propagation.

5. The device for peening by coupling the laser shock wave and the ultrasonic shock wave in real time according to claim 1, wherein the two racks are respectively provided with electromagnetic devices for locking positions of the two racks on the two second sliding devices.

6. A peening method using the device for peening by coupling the laser shock wave and the ultrasonic shock wave in real time according to claim 2, the peening method comprising the following steps:
emitting, by the laser device, the laser beam to preheat the workpiece;
controlling, by the control system, the synchronization device to allow the two ultrasonic shock devices to be synchronously rotated until an angle between each of the two ultrasonic shock devices and the surface of the workpiece is $\alpha_1$;
adjusting the center distance of the two transmission piles; adjusting, by the first hydraulic cylinders, heights of the two transmission piles; and controlling, by the synchronization device, the two ultrasonic shock devices to synchronously move toward each other, such that the shock head of each of the two ultrasonic shock devices contacts and compresses a respective one of the two transmission piles;
controlling the second hydraulic cylinders to compress, such that the two transmission piles contact and compress the workpiece;
covering the surface of the workpiece with a confining layer;
controlling the two ultrasonic shock devices to release the ultrasonic shock wave; and driving, by the two hydraulic oscillating cylinders, the two ultrasonic shock devices to rotate, such that the two ultrasonic shock devices each release the ultrasonic shock wave for n times within a rotation range; and
controlling, by the control system, the laser device to perform the laser shock, after the two ultrasonic shock devices work for the time $\Delta T$, so as to couple the laser shock wave and the ultrasonic shock wave in real time for peening.

* * * * *